(12) United States Patent
Liu et al.

(10) Patent No.: US 11,872,471 B2
(45) Date of Patent: Jan. 16, 2024

(54) BRAKING MECHANISM OF A WHEELED DEVICE

(71) Applicants: Wen-Kuei Liu, Taichung (TW); Hsiu-Feng Chen, Taichung (TW); Chao-Hsuan Liu, Taichung (TW); Yu-Chun Liu, Taichung (TW); Yi-Shan Liu, Taichung (TW); Yu-Cheng Liu, Taichung (TW); Yan-Rui Liu, Taichung (TW)

(72) Inventors: Wen-Kuei Liu, Taichung (TW); Hsiu-Feng Chen, Taichung (TW); Chao-Hsuan Liu, Taichung (TW); Yu-Chun Liu, Taichung (TW); Yi-Shan Liu, Taichung (TW); Yu-Cheng Liu, Taichung (TW); Yan-Rui Liu, Taichung (TW)

( * ) Notice: Subject to any disclaimer, the term of this patent is extended or adjusted under 35 U.S.C. 154(b) by 74 days.

(21) Appl. No.: 17/735,370

(22) Filed: May 3, 2022

(65) Prior Publication Data

US 2023/0356061 A1 Nov. 9, 2023

(51) Int. Cl.
| *A63C 17/14* | (2006.01) |
| *F16D 59/02* | (2006.01) |
| *F16D 59/00* | (2006.01) |
| F16D 121/14 | (2012.01) |

(52) U.S. Cl.
CPC .......... *A63C 17/1418* (2013.01); *F16D 59/00* (2013.01); *F16D 2121/14* (2013.01)

(58) Field of Classification Search
CPC .............. A63B 21/02; A63B 21/00058; A63B 21/00069; A63B 21/00072; A63B 22/06; A63C 17/1418; A63C 17/14; F16D 59/00; F16D 2121/14; F16D 49/00; F16D 59/02
See application file for complete search history.

(56) References Cited

U.S. PATENT DOCUMENTS

| 6,491,606 | B1 * | 12/2002 | Swift | A63B 22/0605 482/65 |
| 7,314,434 | B2 * | 1/2008 | Chen | A63B 21/0051 188/164 |
| 7,367,568 | B2 * | 5/2008 | Lansel | A63C 17/1418 280/11.221 |
| 7,455,305 | B2 * | 11/2008 | Bellehumeur | A63C 17/1427 188/29 |
| 7,901,334 | B2 * | 3/2011 | Chen | A63B 21/4049 482/63 |
| 9,168,785 | B2 * | 10/2015 | Spektor | B60B 33/0081 |

(Continued)

FOREIGN PATENT DOCUMENTS

DE 202012004632 U1 * 10/2012 ......... A63C 17/1418

*Primary Examiner* — Thomas W Irvin

(74) *Attorney, Agent, or Firm* — MUNCY, GEISSLER, OLDS & LOWE, P.C.

(57) ABSTRACT

A braking mechanism of a wheeled device is provided, including: a main body, configured to be connected to the wheeled device including at least one wheel; an adjusting member, disposed on the main body and including a rod and a first abutting member adjustably positioned on the rod; a braking member, movably disposed on the main body; and an elastic member, abutted between the first abutting member and the braking member so that the braking member is biased by the force of the elastic member toward the at least one wheel to frictionally contact the at least one wheel.

9 Claims, 5 Drawing Sheets

(56) References Cited

U.S. PATENT DOCUMENTS

| | | | |
|---|---|---|---|
| 9,593,992 B2* | 3/2017 | Wu .................. | A63B 21/015 |
| 11,484,743 B2* | 11/2022 | Gibson ............. | A63B 21/225 |
| 11,504,564 B2* | 11/2022 | Hsu .................. | A63B 21/015 |
| 2005/0159274 A1* | 7/2005 | Chen ................ | A63B 21/0051 |
| | | | 482/63 |
| 2006/0097465 A1* | 5/2006 | Lansel .............. | A63C 17/1418 |
| | | | 280/11.204 |
| 2009/0212520 A1* | 8/2009 | Quendez ........... | A63C 17/1418 |
| | | | 280/87.041 |
| 2015/0210114 A1* | 7/2015 | Spektor ............. | B62B 5/0438 |
| | | | 16/35 R |
| 2016/0377495 A1* | 12/2016 | Wu ................... | A63B 22/0605 |
| | | | 73/862.193 |
| 2018/0008856 A1* | 1/2018 | Radow .............. | A63B 69/16 |
| 2021/0370124 A1* | 12/2021 | Hsu .................. | A63B 21/00069 |

* cited by examiner

BRAKING MECHANISM OF A WHEELED DEVICE

BACKGROUND OF THE INVENTION

Field of the Invention

The present invention relates to a braking mechanism of a wheeled device.

Description of the Prior Art

Recently, people have paid more and more attention to leisure sports, which can relax the mind and train the body at the same time, so it is very popular. Four-wheeled skates, inline skates, skateboards or similar wheeled sports equipment, have advantages of convenient acquisition, small size, and less spatial limitation, so they are ones of most common wheeled devices.

However, because the wheeled device has wheels with little rolling friction, and the wheel is not equipped with a braking member that increases friction and adjusts the rolling speed of the wheel, for beginners, it is difficult to maintain balance and extremely difficult to control, resulting in poor learning efficiency, and it is easy to cause fall injury.

The present invention is, therefore, arisen to obviate or at least mitigate the above-mentioned disadvantages.

SUMMARY OF THE INVENTION

The main object of the present invention is to provide a braking mechanism of a wheeled device whose braking performance is adjustable.

To achieve the above and other objects, a braking mechanism of a wheeled device is provided, including: a main body, configured to be connected to the wheeled device including at least one wheel; an adjusting member, disposed on the main body and including a rod and a first abutting member adjustably positioned on the rod; a braking member, movably disposed on the main body; and an elastic member, abutted between the first abutting member and the braking member so that the braking member is biased by the force of the elastic member toward the at least one wheel to frictionally contact the at least one wheel.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
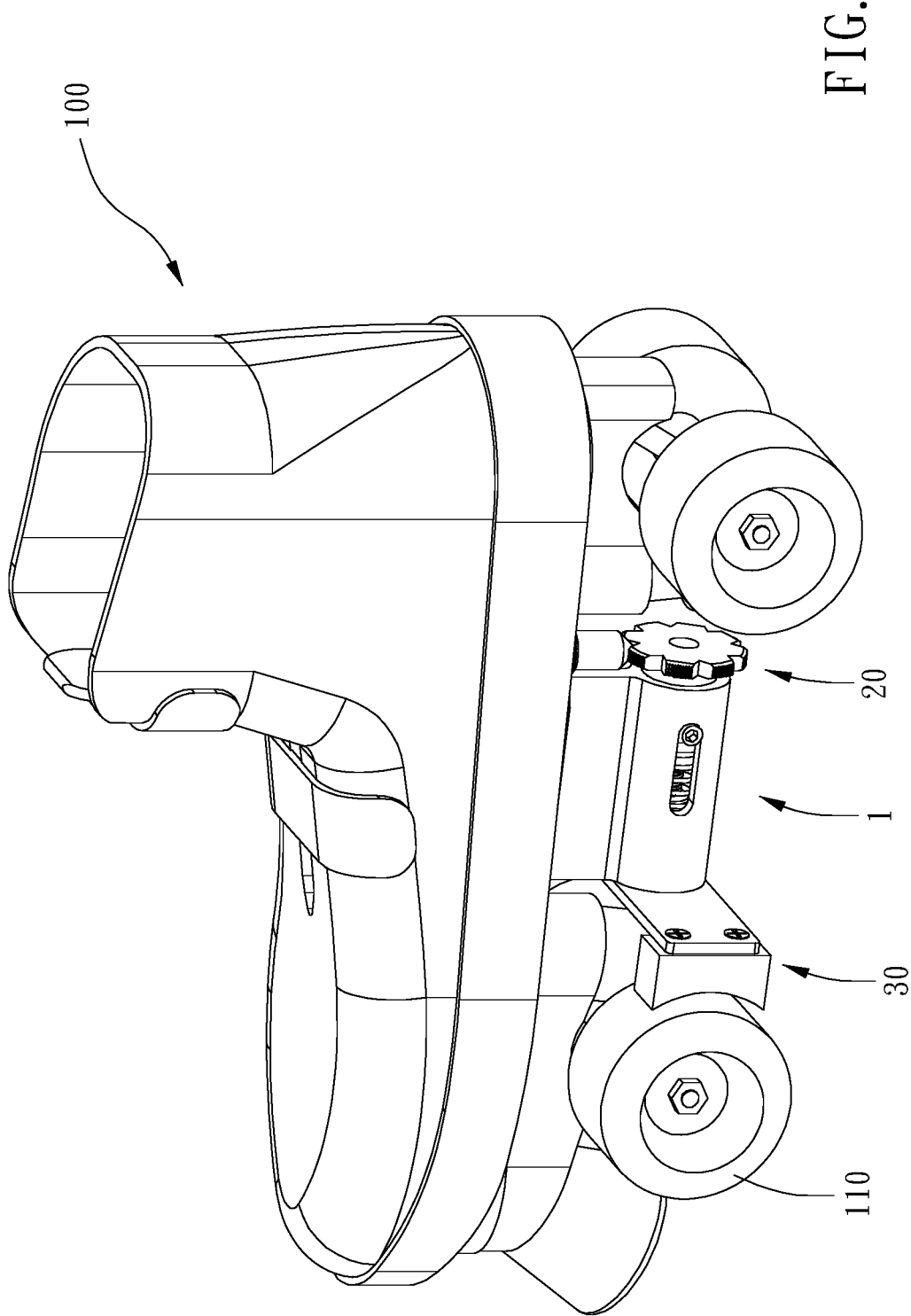
FIG. 1 is a stereogram of a preferable embodiment of the present invention.
Figure 2:
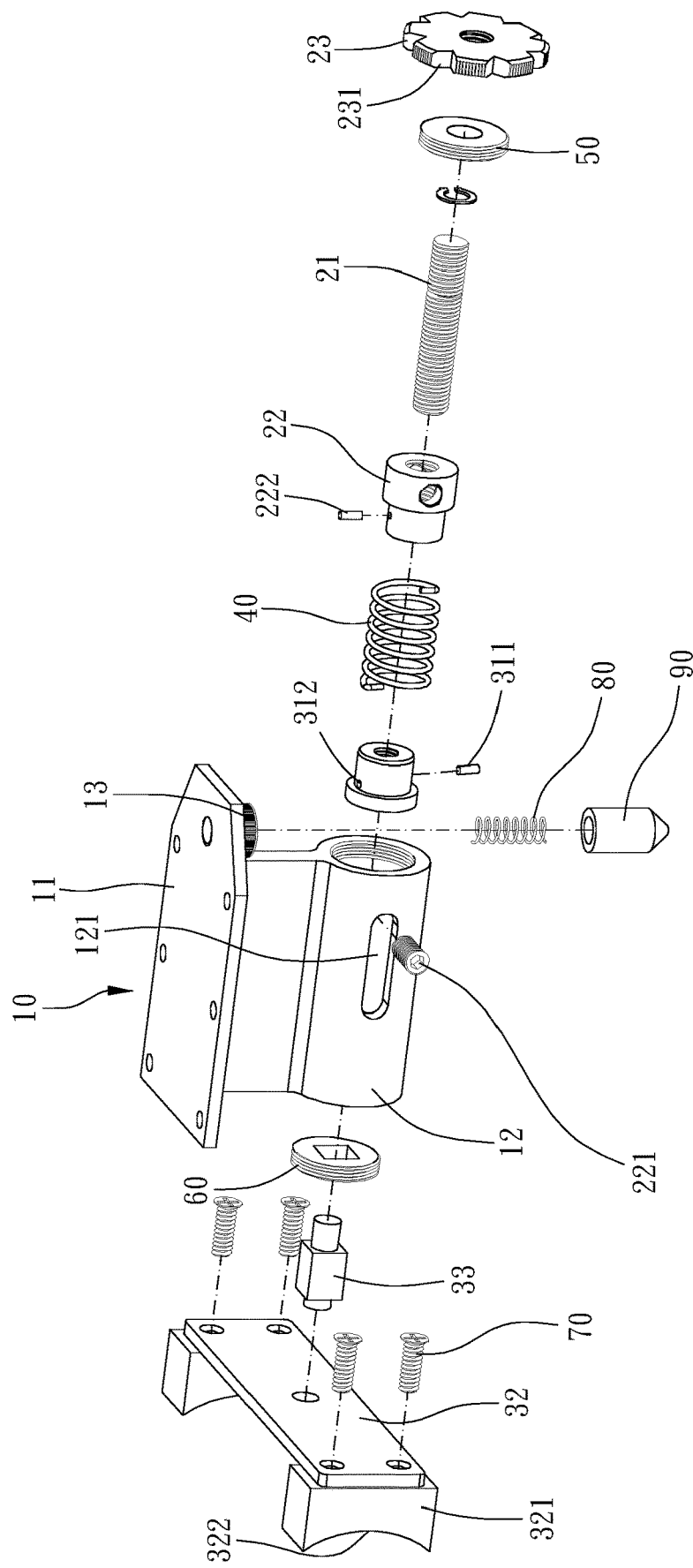
FIG. 2 is a breakdown drawing of a preferable embodiment of the present invention.
Figure 3:
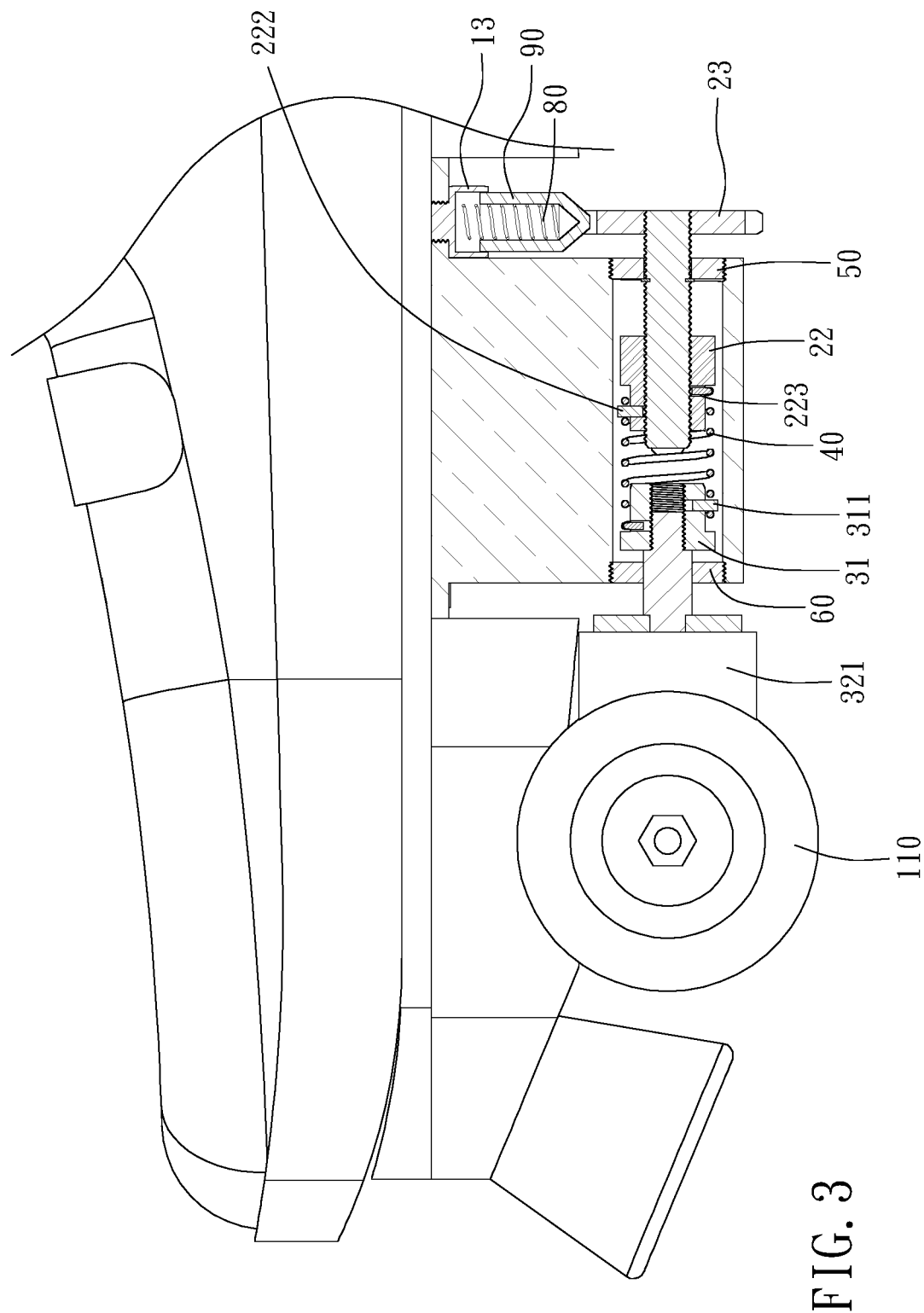
FIGS. 3-5 are cross-sectional views showing operation of a preferable embodiment of the present invention.
Figure 4:
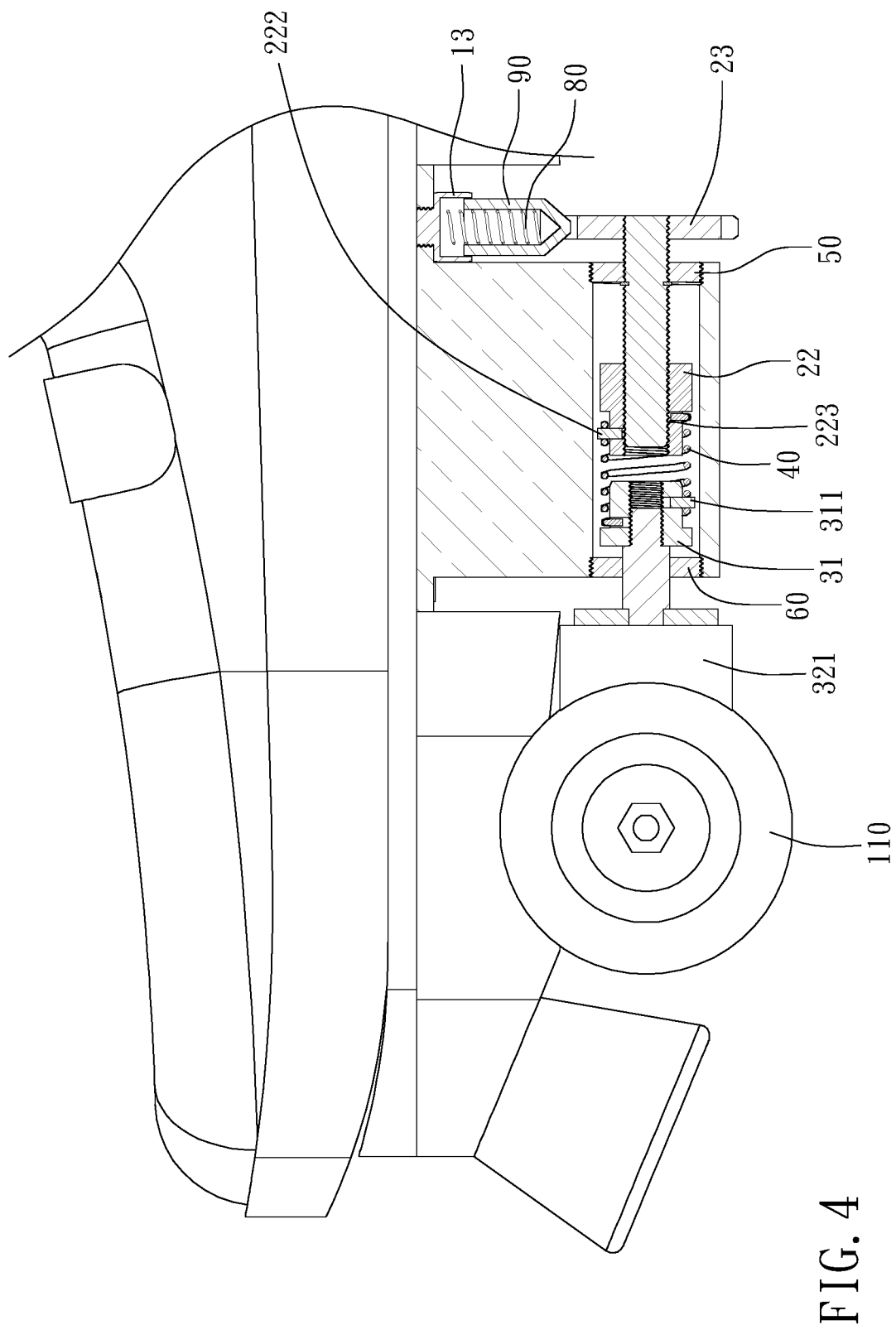

Please refer to FIGS. 1 to 5 for a preferable embodiment of the present invention. A braking mechanism 1 of a wheeled device of the present invention includes a main body 10, an adjusting member 20, a braking member 30 and an elastic member 40.

The main body 10 is configured to be connected to the wheeled device 100 including at least one wheel 110, wherein the wheeled device 100 may be four-wheeled skates, inline skates, skateboards or similar wheeled sports equipment. The adjusting member 20 is disposed on the main body 10, the adjusting member 20 includes a rod 21 and a first abutting member 22 adjustably positioned on the rod 21. The braking member 30 is movably disposed on the main body 10. The elastic member 40 is abutted between the first abutting member 22 and the braking member 30 so that the braking member 30 is biased by the force of the elastic member 40 toward the at least one wheel 110 to frictionally contact the at least one wheel 110. Whereby, the frictional contact level of the braking member 30 and the at least one wheel 110 is adjustable, which is advantageous for playing and controlling the wheeled device and prevents the user from injury due to falling down.

The main body 10 includes a base portion 11 configured to be connected to the wheeled device 100 and a tubular portion 12 connected to the base portion 11. The base portion 11 may be fixed to the wheeled device by a plurality of connectors or fasteners, or the base portion 11 may be fixedly embedded in and encompassed by the bottom of the wheeled device. The rod 21 is inserted in the tubular portion 12, the first abutting member 22 is received in the tubular portion 12 and movable along the tubular portion 12, and the braking member 30 is mounted to and movable relative to the tubular portion 12. Specifically, an end plate 50 is screwed to an end of the tubular portion 12, and the rod 21 is movably disposed through the end plate 50, thus being simple in structure, manufacturing and assembling.

Specifically, the braking member 30 includes a second abutting member 31 movably mounted to an end of the tubular portion 12 and a board 32 including at least one (preferably, plural) braking pad 321, and the board 32 is movable with the second abutting member 31. The elastic member 40 is disposed between the first abutting member 22 and the second abutting member 31 so that the at least one braking pad 321 can be urged to contact the at least one wheel 110. An end plate 60 is screwed to an end of the tubular portion 12, and the second abutting member 31 is movably disposed through the end plate 60, thus being simple in structure, manufacturing and assembling. Preferably, the second abutting member 31 includes a non-circular section 33 disposed through the end plate 60, the non-circular section 33 axially movable relative to the end plate 60 and non-rotatable relative to the end plate 60, which restricts and stabilizes the braking member 30 and provides good braking performance. The tubular portion 12 includes at least one guiding slot 121, and the first abutting member 22 includes at least one projection 221 slidably received within the at least one guiding slot 121. The at least one projection 221 may be detachably connected to or integrally formed as a part of the first abutting member 22.

In this embodiment, the base portion 11 and the tubular portion 12 are integrally formed of one piece, the tubular portion 12 includes a plurality of guiding slots 121, and the first abutting member 22 includes a plurality of projections 221 which are detachable and slidably received within the plurality of guiding slots 121, so that the first abutting member 22 can be stably guided. The at least one braking pad 321 includes a concave surface 322 configured to correspond to and frictionally contact the at least one wheel 110, which provides good braking performance. The plurality of fasteners 70 are disposed through the board 32 so that the at least one braking pad 321 is detachably secured to the board 32, which is easy to assemble/disassemble and replace. The plurality of fasteners 70 are preferably not protrusive beyond an outer surface of the at least one braking pad 321, which prevents lowering of braking performance and prevents the at least one wheel 110 from being damaged. The first abutting member 22 and the second abutting member 31 each further includes a blocking protrusion 222, 311 and an insertion hole 223, 312, the elastic member 40 is coil spring, and the coil spring is disposed around disposed around the first abutting member 22 and the second abutting member 31. Distal ends of the coil spring are inserted in the insertion hole 223 of the first abutting member 22 and the insertion hole 312 of the second abutting member 31, respectively. The coil spring is axially blocked by the blocking protrusion 222 of the first abutting member 22 and the blocking protrusion 311 of the second abutting member 31, so that the structural relationship and relative positions of the first abutting member 22, the second abutting member 31 and the elastic member 40 are stabilized and restricted.

Figure 5:
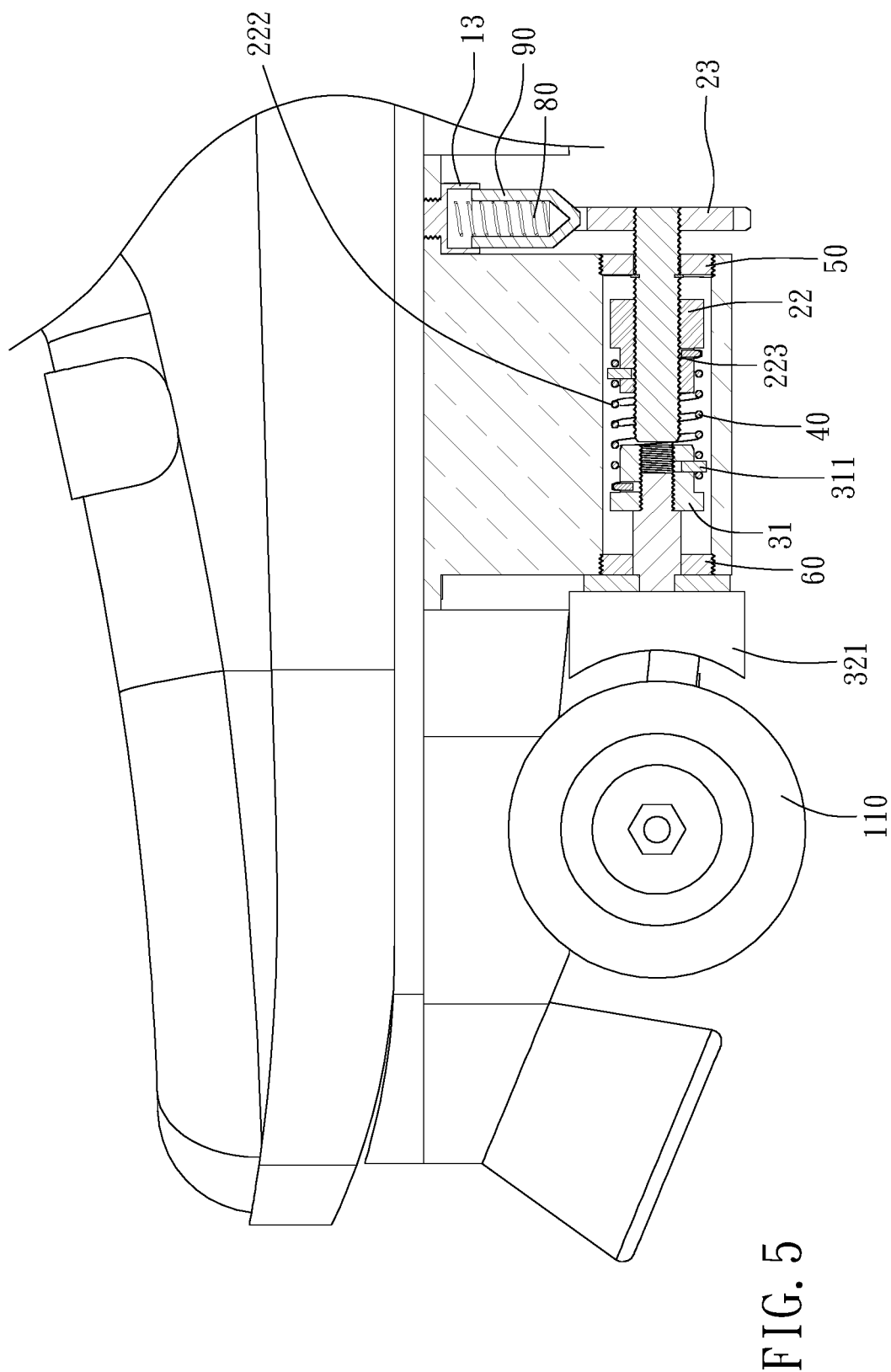

Preferably, two ends of the elastic member 40 are movable with the first abutting member 22 and the braking member 30, respectively. The first abutting member 22 can drive the elastic member 40 to move the braking member 30 away from the at least one wheel 110 so that the braking member 30 is distanced from the at least one wheel 110 and the at least one wheel 110 is free of brake (FIG. 5). The main body 10 further includes a seat portion 13, the rod 21 is a threaded rod, the adjusting member 20 further includes a rotatable member 23 rotatable with the rod 21, the first abutting member 22 is screwed on the threaded rod, the rotatable member 23 includes a plurality of notches 231 arranged around the rod 21, and an elastic member 80 is disposed between the seat portion 13 and a positioning member 90. The positioning member 90 is releasably engaged within one of the plurality of notches 231 so that the rotatable member 23 is restricted in a set position without free rotational movement.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A braking mechanism of a wheeled device, including:
   a main body, configured to be connected to the wheeled device including at least one wheel;
   an adjusting member, disposed on the main body and including a rod and a first abutting member adjustably positioned on the rod;
   a braking member, movably disposed on the main body; and
   an elastic member, abutted between the first abutting member and the braking member so that the braking member is biased by the force of the elastic member toward the at least one wheel to frictionally contact the at least one wheel;
   wherein the main body includes a base portion configured to be connected to the wheeled device and a tubular portion connected to the base portion, the rod is inserted in the tubular portion, the first abutting member is received in the tubular portion and movable along the tubular portion, and the braking member is mounted to and movable relative to the tubular portion.

2. The braking mechanism of claim 1, wherein an end plate is screwed to an end of the tubular portion, and the rod is movably disposed through the end plate.

3. The braking mechanism of claim 1, wherein the braking member includes a second abutting member movably mounted to an end of the tubular portion and a board including at least one braking pad, the board is movable with the second abutting member, and the elastic member is disposed between the first abutting member and the second abutting member.

4. The braking mechanism of claim 3, wherein an end plate is screwed to the tubular portion, and the second abutting member is movably disposed through the end plate.

5. The braking mechanism of claim 4, wherein the second abutting member includes a non-circular section disposed through the end plate, and the non-circular section is axially movable relative to the end plate and non-rotatable relative to the end plate.

6. The braking mechanism of claim 5, wherein the base portion and the tubular portion are integrally formed of one piece, a second end plate is screwed to an end of the tubular portion, the rod is movably disposed through the second end plate; the tubular portion includes a plurality of guiding slots, the first abutting member includes a plurality of projections which are detachable and slidably received within the plurality of guiding slots; the at least one braking pad includes a concave surface configured to correspond to and frictionally contact the at least one wheel; a plurality of fasteners are disposed through the board so that the at least one braking pad is detachably secured to the board; the plurality of fasteners are not protrusive beyond an outer surface of the at least one braking pad; the first abutting member and the second abutting member each further includes a blocking protrusion and an insertion hole, the elastic member is a coil spring, the coil spring is disposed around the first abutting member and the second abutting member, distal ends of the coil spring are inserted in the insertion hole of the first abutting member and the insertion hole of the second abutting member, respectively; the coil spring is axially blocked by the blocking protrusion of the first abutting member and the blocking protrusion of the second abutting member.

7. The braking mechanism of claim 1, wherein the tubular portion includes at least one guiding slot, and the first abutting member includes at least one projection slidably received within the at least one guiding slot.

8. The braking mechanism of claim 1, wherein two ends of the elastic member are movable with the first abutting member and the braking member, respectively, so that the first abutting member drives the elastic member to move the braking member away from the at least one wheel.

9. The braking mechanism of claim 1, wherein the main body includes a seat portion, the rod is a threaded rod, the adjusting member further includes a rotatable member rotatable with the rod, the first abutting member is screwed on the threaded rod, the rotatable member includes a plurality of notches arranged around the rod, a second elastic member is disposed between the seat portion and a positioning member, and the positioning member is releasably engaged within one of the plurality of notches.

* * * * *